US006753952B1

(12) United States Patent
Lawrence et al.

(10) Patent No.: US 6,753,952 B1
(45) Date of Patent: Jun. 22, 2004

(54) SPECIALISED SURFACE

(75) Inventors: Christopher R Lawrence, Hampshire (GB); Peter Vukusic, Exeter (GB); John R Sambles, Exeter (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 09/959,616

(22) PCT Filed: May 19, 2000

(86) PCT No.: PCT/GB00/01837

§ 371 (c)(1),
(2), (4) Date: Nov. 1, 2001

(87) PCT Pub. No.: WO00/72275

PCT Pub. Date: Nov. 30, 2000

(30) Foreign Application Priority Data

May 25, 1999 (GB) .......................................... 9912081

(51) Int. Cl.[7] .............................................. G06K 9/74
(52) U.S. Cl. ..................................................... 356/71
(58) Field of Search ........................................ 356/71

(56) References Cited

U.S. PATENT DOCUMENTS 4,501,439 A 2/1985 Antes
5,497,227 A * 3/1996 Takeuchi et al. .............. 356/71
5,714,231 A 2/1998 Reinhart

FOREIGN PATENT DOCUMENTS

EP 0194042 9/1986
EP 0 194 042 A2 * 9/1986 .......... G06K/19/08

OTHER PUBLICATIONS

Patent Abstract JP 10 081058 A; vol. 1998, No. 08, Jun. 30, 1998.

* cited by examiner

*Primary Examiner*—Frank G. Font
*Assistant Examiner*—Amanda Merlino
(74) *Attorney, Agent, or Firm*—Nixon & Vanderhye P.C.

(57) ABSTRACT

A multilayer surface comprising at least two layers, said layers having different refractive indexes such that selective wavelengths/colours are transmitted and or reflected. The layers are preferably laid onto a transparent substrate. The surface can be used as an anti-counterfeit device. A method of determining whether an article is counterfeit comprising: providing such a surface; determining its transmission/absorption characteristics of particular colour(s); matching these up with the expected characteristics to determine whether the surface is counterfeit. This may comprise observing the reflected or transmitted colour at two different angles of incidence or detecting changes in the polarisation state of transmitted light.

10 Claims, 5 Drawing Sheets

SPECIALISED SURFACE

This application is the U.S. national phase of International Application No. PCT/GB00/01837, filed May 19, 2000, which designated the U.S., the entire content of which is hereby incorporated by reference.

BACKGROUND OF THE INVENTION

1. Field of the Invention

This invention relates to a transparent surface, which selectively absorbs, reflects and transmits different wavelengths in a determined fashion. It has particular but not exclusive application in the field of anti-counterfeiting (security) devices.

2. Discussion of Prior Art

In the fight against counterfeiting, there is ever increasing pressure to develop security devices and markings which are difficult to forge i.e. replicate. Moreover it is a requirement that such anti-counterfeiting devices are simple and effective to use without the need for additional, often expensive equipment.

SUMMARY OF THE INVENTION

The invention comprises a method of determining whether an article is counterfeit; comprising;

a) providing a textured surface;

b) determining the reflection characteristics of the surface;

c) matching these up with the expected characteristics to determine whether the surface is counterfeit.

In the simplest form of the invention the textured surface comprises of a single (preferably metallic) textured surface.

Preferably the surface is a multilayer consisting of a transparent substrate having at least two thin layers of transparent material deposited on one side thereof, said layers having different refractive indices such that selective wavelengths/colours are transmitted and or reflected The thin multiple layers applied to a transparent substrate provide constructive and destructive interference effects due to multiple reflections at the interfaces between materials.

Preferably the layers are fabricated from metal oxide, metal sulphide or polymeric materials. Individual layers will generally be less than or equal to half a wavelength in thickness when compared to the radiation to be utilised (e.g. for visible light each layer will generally be less than 400 nanometres thick).

The surface may additionally have a coloured or shaded layer applied to the substrate on the opposite of said side to the thin layers.

Such surface may be used as security anti/counterfeit tags, the substrate preferably a transparent plastic material The invention also consists of a method of determining whether an article is counterfeit comprising:

a) providing such a surface as above;

b) determining its transmission absorption frequencies/colours characteristics;

c) matching these up with the expected characteristics to determine whether the surface is counterfeit.

Step (b) may include a comparison of reflected and/or transmitted spectra at different angles of incidence and/or linear polarisation states of the incident radiation.

Where the surfaces are textured step (b) may further include the detection of changes in the polarisation state of reflected radiation.

BRIEF DESCRIPTION OF THE DRAWING

The invention will now be described by way of example only and with reference to the following figures of which.

Simple Multilayer Embodiment

Figure 1:
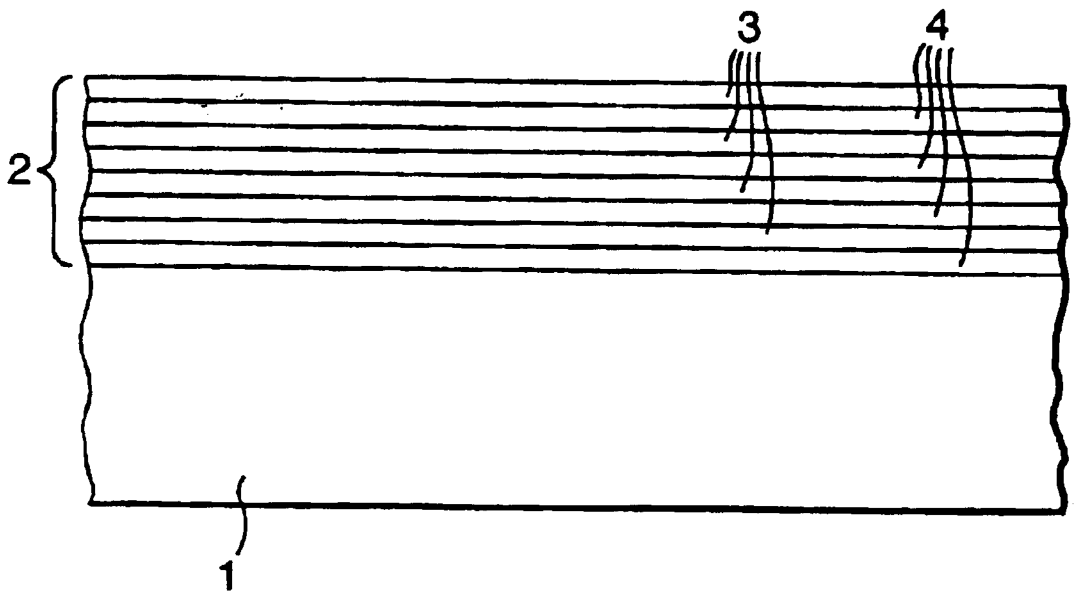
FIG. 1 shows a basic flat multilayer surface.

FIG. 1 shows a substrate 1 comprising a glass plate onto which is a multilayer 2 comprising interleaved layers of ZnS, and $MgF_2$ denoted by reference numerals 3 and 4. These are thermally evaporated onto the glass plate, the ZnS first, and with all layers (eight in total) being 120nm thick.

Other methods of providing the layers are by sputtering, electron beam deposition, or laser oxidation of metals. Other materials well known to those skilled in the art, such as $TiO_2$ or polymers, can be alternatively used as the layers. A given multilayer stack will produce a reflectivity profile that can be predicted via Fresnel's equations; it is dictated by both the deposited layers oxide's thickness and refractive index. The profile will vary with both the angle of incidence and the linear polarisation of the illuminating light.

In the example of FIG. 1, when white light is made incident upon the multilayer surface at normal incidence the reflected light is blue in colour, and the transmission colour is orange. If the surface is placed substrate-first onto a black background then only blue will be seen (the transmitted orange light is absorbed). If the background is smooth and highly reflective (gloss white or metallic) then all of the transmitted orange light is reflected back through the film and the surface will appear white or very slightly coloured. If a white and roughened (i.e. diffusely scattering) background is placed behind (substrate first) the multilayer surface, then the surface will appear orange because the transmitted colour will dominate. This is because the only blue light that reaches the eye will be from specular (i.e. mirror-like) reflections from the multilayer, whereas all light transmitted through the layer will be diffusely reflected back through it, whatever its angle of incidence (see FIG. A). Hence in all but highly directional lighting conditions the orange light will dominate.

The thickness of the layers should be between ¼ and 1 wavelength of the light used in the application. For visible light the thickness should be less than 800nm.

Anti-counterfeit Device Embodiment

The multilayer according to the invention may be used as an anti-counterfeiting device. The multilayer surface may be laid onto any appropriate background (substrate first) such as a black and diffuse-white coded background and/or having coloured inks. The observed colour can be examined against two coloured inks painted onto the coded surface next to the black and white elements.

Figure 2:
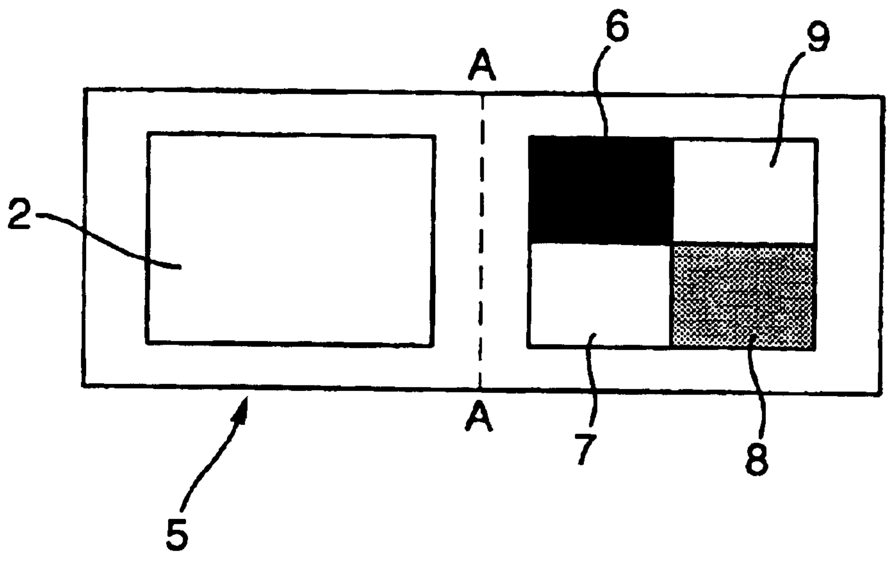
FIG. 2 shows an anti-counterfeit tag embodying a surface as in FIG. 1.

FIG. 2*a* shows a practical embodiment of a security tag. The multilayer 2 is deposited onto one potion of a flexible transparent plastic tag 5; i.e. it acts as a substrate. The other portion has black and (diffusely reflective) white squares, 6 and 7 respectively printed onto it. Also printed onto it are orange 8 and blue 9 inked squares having particular hues. The tag can then be folded over along fold A—A such that the squares lie underneath the plastic tag. If the blue reflection observed from the multilayer on the black square is not the same hue as the blue ink and/or the orange transmitted colour from the multilayer on the white square is not the same hue as the orange ink, then the multilayer surface is counterfeit.

In an alternative embodiment a surface having black/white/coloured background may be permanently stuck to the substrate by different means i.e. the substrate itself may be utilised as part of the pattern if it is of a suitable colour In another embodiment, the multilayer is placed over a diffusely-reflective white substrate, and its surface is illuminated and observed at normal incidence (e.g. by two parallel fibres, one of which transmits light whilst the other detects the reflection). If only the normally incident light is measured then the orange transmitted light will be scattered at the substrate and will give a low signal back at the detector, and the blue reflection will dominate. Hence the device will indicate that the surface is blue, whilst by eye the material will appear orange due to ambient light.

Effect of Angle of Incidence

Figure 3:
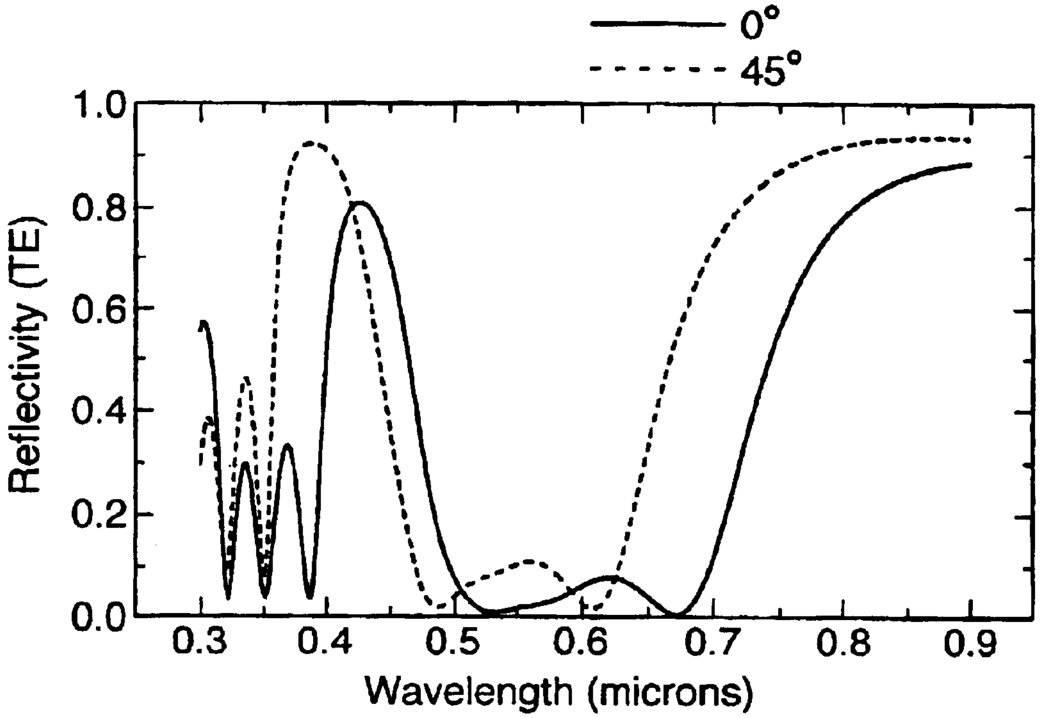
FIG. 3 shows the effect of colour shift of a multilayer surface (as per FIG. 1) dependent upon the incident angle of applied light.

As shown in FIG. 3, the angle at which the light strikes a: multilayer influences its reflectivity (and hence transmnissivity) profile. Using the above example of the multilayer comprising eight interleaved layers of ZnS and $MgF_2$, it is seen that as the angle of incidence of light is increased, the reflected light from the surface shifts to shorter wavelengths, and hence the colour changes from blue to purple (whilst the transmission moves from orange to yellow).

It is proposed that the angle-dependance of colour from a planar multilayer could be utilised via a device that simultaneously obtained reflectivity or transmissivity spectra at different angles, and compared these to expected values.

Effect of Polarisation

Figure 4:
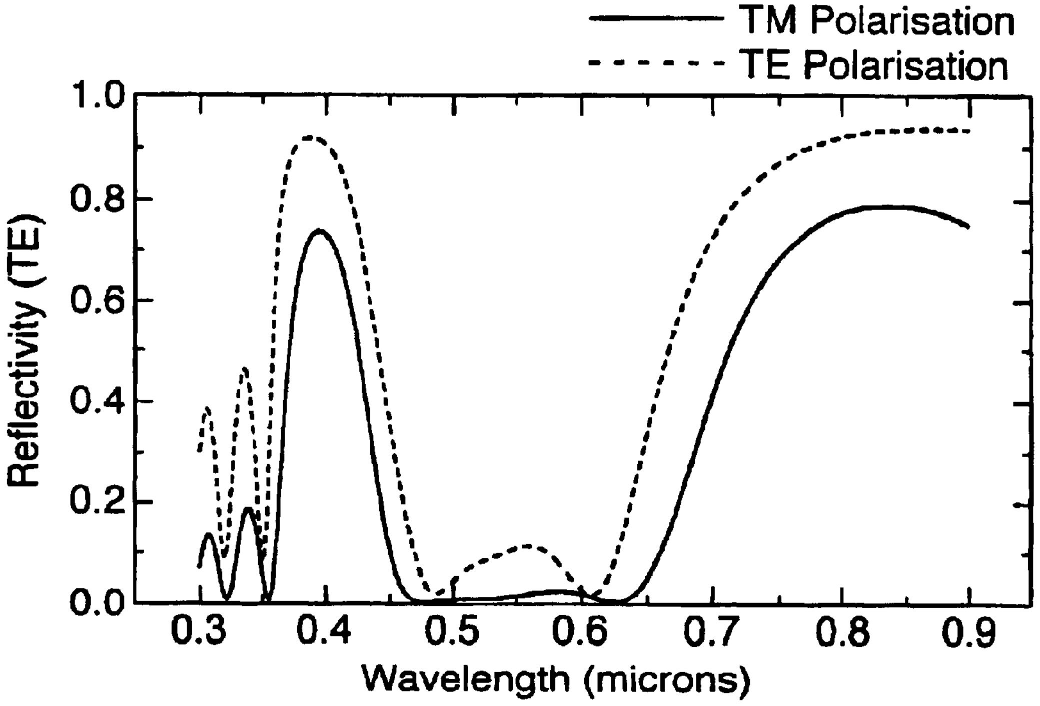
FIG. 4 shows the effect of linear polarisation when light is made incident upon a multilayer (or portion of a multilayer) at 45 degrees incidence.

As shown in FIG. 4, the polarisation of the light will influence the reflectivity (and hence transmissivity) spectra of multilayers. In the diagram, TM linearly polarised radiation is taken to be radiation for which the electric vector lies in the plane of incidence of the incoming radiation, whilst for TE radiation the electric vector lies parallel to the surface that is struck. At normal incidence the TE and TM reflectivities are equivalent, but at any other angle their spectra will differ.

It is proposed that any non-normal-incidence measurements could discriminate between different polarisations to further distinguish between different multilayers. For example, this could be achieved by placing aligned polaroid sheets over the light source and the detector, limiting all measurements to one linear polarisation. If infrared radiation were to be utilised then wire-grid polarisers could replace the polaroid.

Textured Substrate/Layer Embodiment

In an alternative embodiment the multilayer is textured. For example the multilayer surface can be produced with a grooved, pitted or waveform profile. In this manner, polarisation effects or effects due to variation of angle of incidence of light can be utilised via normal-incidence measurements.

Figure 5A:
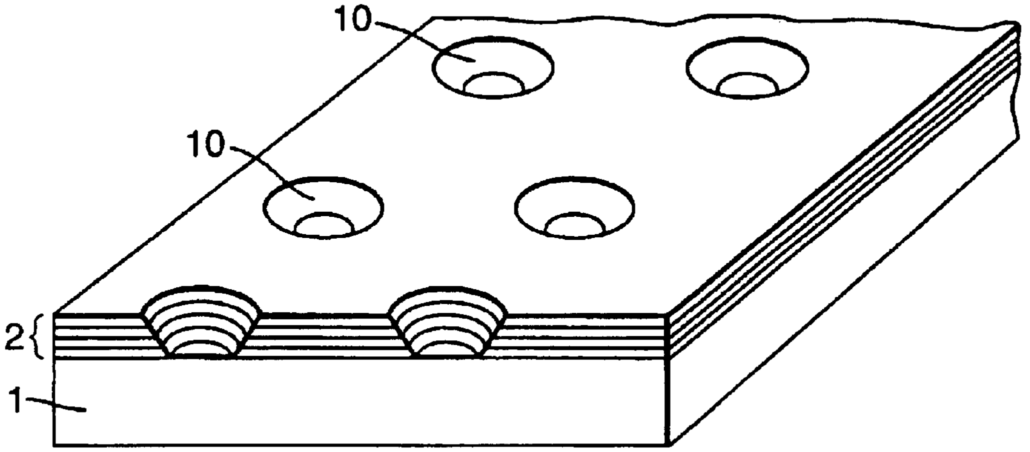
FIG. 5 shows a multilayer surface having a pitted surface and FIGS. 5*b* and 5*c* show cross-sections through pitted surfaces.
Figure 5B:
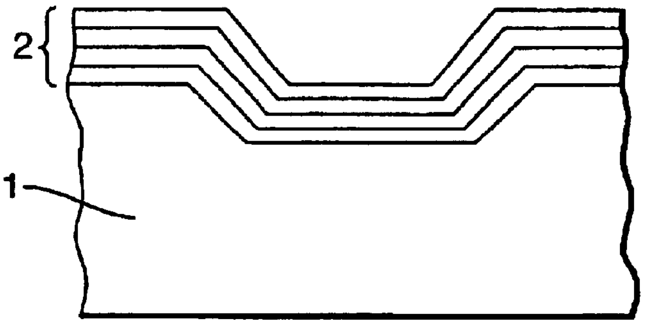

FIG. 5*a* shows a pitted surface and 5*b* a cross section through such a surface respectively. The multilayer surface is indented with circular depressions of approximately 5 microns diameter (the smallest preferred size for visible light).

Figure 5C:
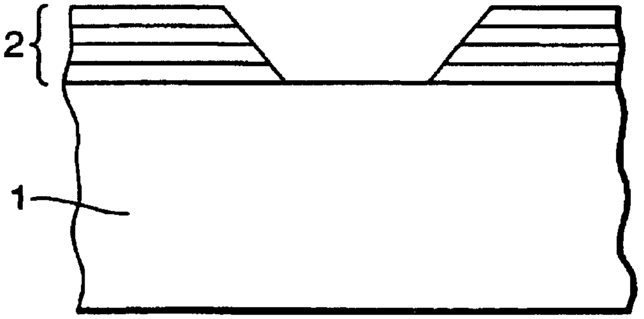

FIG. 5*c* shows a pitted surface wherein the substrate 1 itself is indented. Alternatively the sides of the pits may be perpendicular, and in this case this is equivalent to a substrate having patches of multilayers.

The textured surface may be of any suitable shape; they may be bowl shaped or be flat with 45 degree or any other angle sides.

Figure 6:
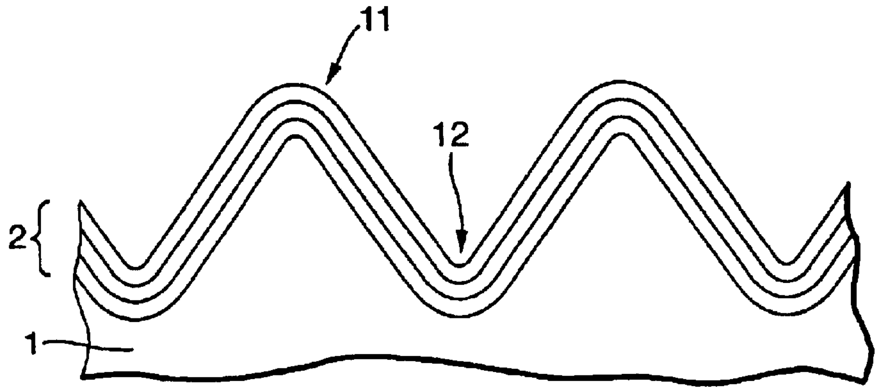
FIG. 6 shows a multilayer having a sinusoidally profiled surface.

FIG. 6 shows a textured multilayer surface of waveform shape, having peaks 11 and troughs 12. The distance between peaks (the pitch) is in the order of at least 5 microns and the depth of the troughs is in the order of half the pitch.

The diameter of the pits (or distance between peaks in a waveform surface) is important and cannot be too small. If the diameter were far less that the wavelength of the light, the pits wouldn't be seen. If the two values were comparable then diffraction effects would be complex, redirecting light in other directions. Thus a diameter of four or more wavelengths is preferable for the dimensions of such pits. Furthermore, the diameter of the pits or wells or distance between peaks of the waveform is less than 200 wavelengths of light.

When illuminated from directly above, the textured surface presents regions of multilayer at normal incidence (the troughs and peaks of the profile), and others at discrete angles of around 45 degrees (the sloped regions). Light striking the 45 degree regions will be reflected across to the opposite sloped element, and subsequently back towards the light source. This simultaneously produces two components of light of different reflectivity spectra, and hence two colours.

It is proposed that textured surfaces such as these could be used to produce two-colour reflections for which the individual elements are too small to resolve with the unaided eye. The colours would then combine to produce a uniform appearance of a single colour, but the covert elements could be viewed by microscope.

It is further proposed that the polarisation-dependence of reflectivity could be used to further distinguish a given structure, since the colours reflected by the sloped elements will exhibit some polarisation dependence.

A further embodiment of the invention is to use flat patches of multilayer on a coloured substrate, as per FIG. 3*b*. The normal-incidence reflection from the multilayers could be matched in colour to that of the substrate, making the patches indistinguishable from the substrate until viewed at such an angle that the patches exhibit a different colour in appearance. The effect could be further enhanced by additionally utilising polarisation differences.

Polarisation-Conversion

Figure 7A:
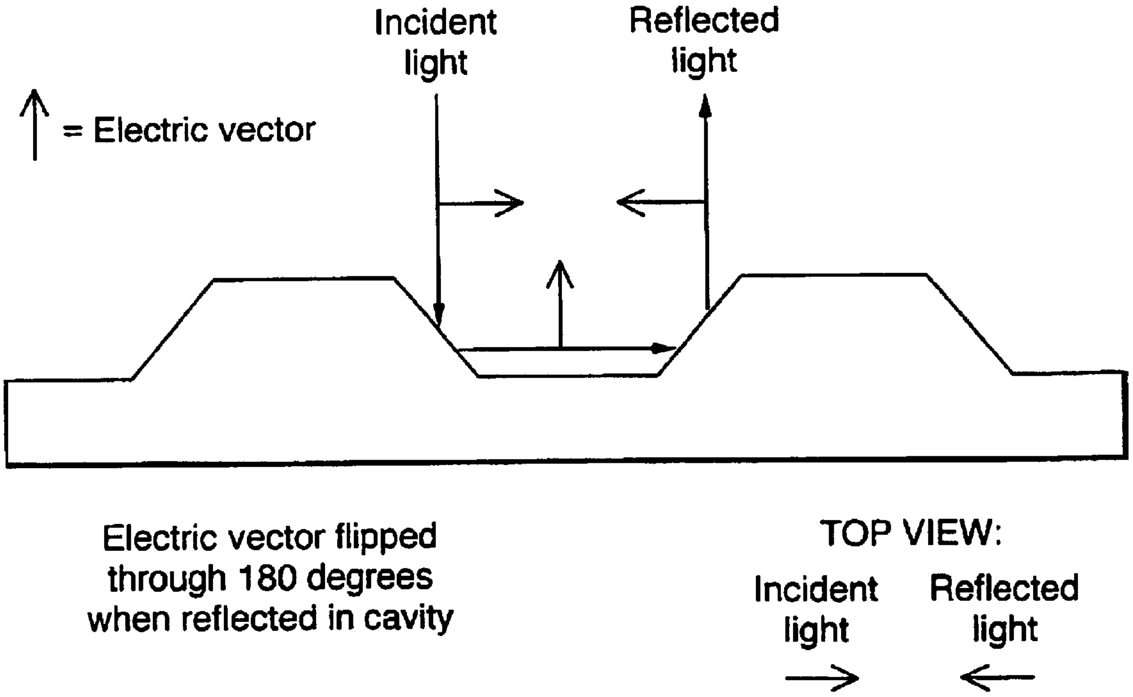
FIGS. 7*a*–7*c* illustrate the rotation of polarized light incident on a textured surface.
Figure 7B:
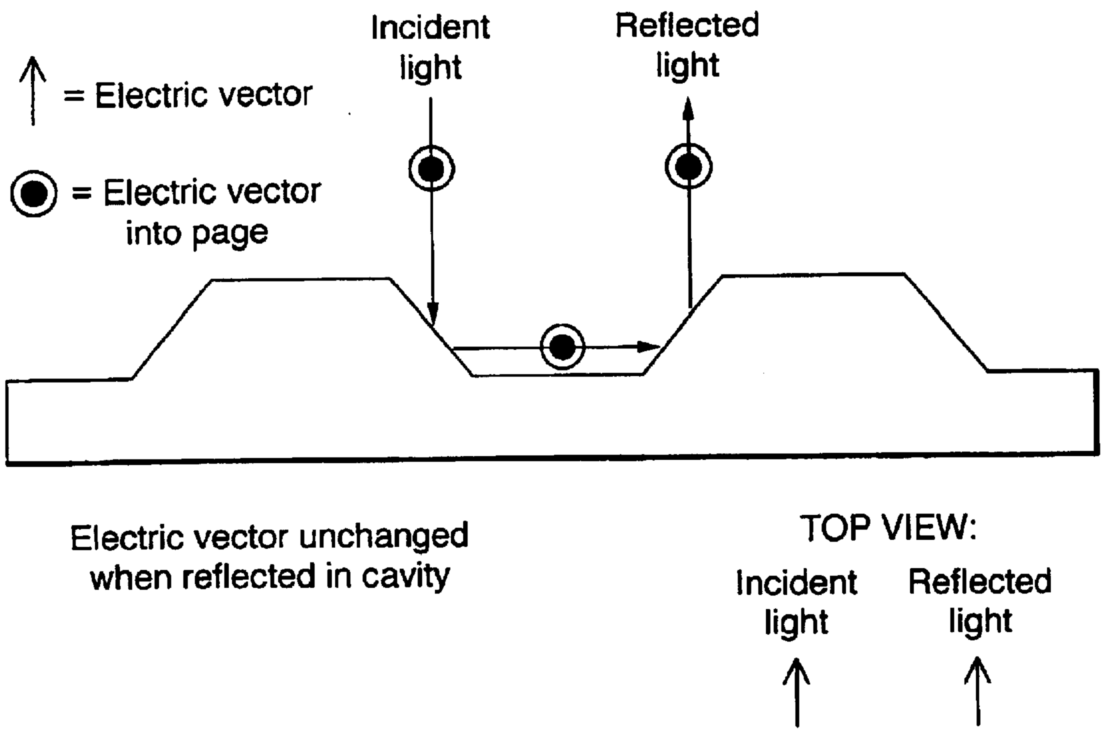
Figure 7C:
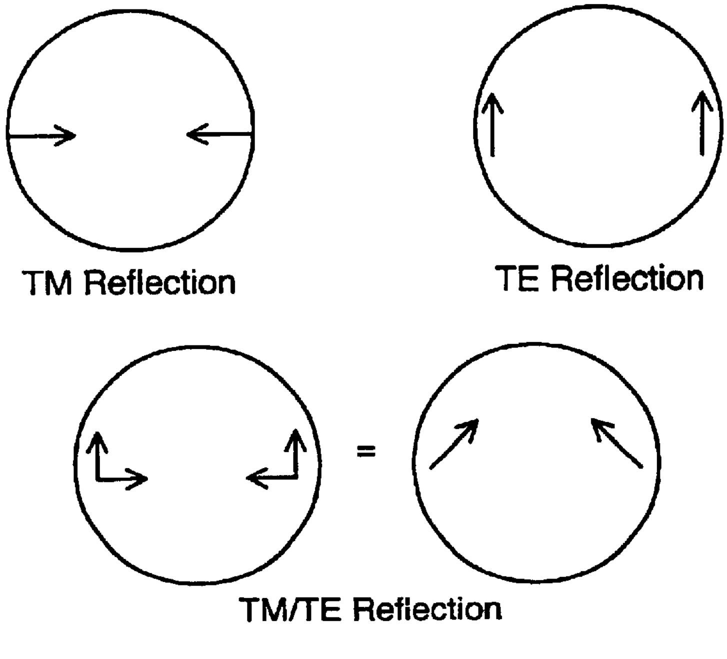

A further aspect of having a textured surface means that it is possible to rotate the linear polarisation angle through 90 degrees, as is shown in FIGS. 7*a* to 7*c*. TM radiation is flipped through 180 degrees whereas TE is not, but in both cases the plane of polarisation is unchanged. However, if equal components of TE and TM are present then the net effect is that the overall plane of polarisation is rotated through 90 degrees.

Take the example of a circular cavity, labelling its circumference as a clock-face. Suppose that light strikes the left hand side (9 o'clock) with the electric vector parallel to the side (i.e. TE polarisation). If all of the photons striking the cavity have parallel electric vectors then light bouncing from 12 o'clock to 6 o'clock must strike the walls as TM polarised light. However, light striking the side halfway between 9and 12 will be of mixed polarisation, half TM and half TE.

It is therefore proposed that linearly polarised light is made incident upon a textured multilayer at such an angle that the overall plane of the electric vector is rotated through 90 degrees, and that this can be detected by placing orthogonally-aligned polaroids over light source and detector. Without these polaroids the usual colours (as described above) can be observed, but when the polaroids are in place the only light that can be detected will be that which has been converted (e.g. four spots at the edge of a bowl-shaped depression, or-for a ridged structure-the signal will only be detected when the electric vector strikes the ridges at an angle neither parallel or perpendicular to the grooves). Furthermore, since the reflection spectrum of light striking the edges is different from that which strikes the bottom of the depression, the polarisation-conversion signal will be of a different colour to that of the unpolarised case.

In the preferred embodiment the multilayer is pitted, the pits having flat 45 degree angled sides as these maximise the amount of light that bounces across and back to an observer at normal incidence, and hence maximise the polarisation conversion signal. Generally the pits must be shaped so that some normal-incidence light is returned by reflection to the source (i.e. retro-reflected). The pit diameter should be sufficiently large so that the light can be specularly reflected (i.e. reflected in a mirror like fashion) and diffractive effects are minimised.

Manufacture of Texture

Where the multilayer may comprises a textured surface (i.e. a non-planar surface), various methods of fabrication can be applied. One possible way would be to deposit the multilayers directly onto a textured substrate (e.g. a diffraction grating). It may be necessary to rock the grating during deposition to ensure even layer thicknesses. Another method is to etch into a thick multilayer to produce different multilayer thicknesses (e.g. a ten layer structure that has been etched down to two in certain regions). A further alternative process is to use dielectric features (e.g. hardened photoresist ridges) on the surface of a planar multilayer to redirect (refract) the light in certain regions, hence altering the angle of incidence and the colour observed.

Although the invention has been discussed predominantly with respect to absorption transmission of visible wavelengths (colours) it should be noted that it is not limited to the visible spectrum and could be used with radiation of other frequencies provided the correct magnitude of dimensions are selected.

What is claimed is:

1. A method of determining whether an article is counterfeit comprising the steps of:

(a) providing a textured multilayered surface;

(b) determining the reflection characteristics of the surface, wherein said reflection comprises multiple reflections from interfaces between said multilayered surface; and (c) matching the reflection characteristics with expected characteristics to determine whether the surface is counterfeit.

2. A method as claimed in claim 1 wherein step (b) comprises determining the wavelength-dependence reflections.

3. A method as claimed in claim 2 wherein step(b) comprises observing the reflected colour at two different angles of incidence.

4. A method as claimed in claim 1 wherein step (b) comprises detecting changes in the polarisation state of the reflected light.

5. A method as claimed in claim 1 wherein the textured surface comprises a transparent or absorbing substrate having at least two layers deposited on one side thereof, said layers having different refractive indexes such that selected wavelengths/colours are transmitted and or reflected.

6. A method as claimed in claim 5 wherein said textured surface has texturing which comprises one of pits or wells in the textured surface and a surface of sinusoidal waveform shape.

7. A method as claimed in claim 6 wherein the diameter of the pits or wells or the distance between the peaks of said waveform is greater than 4 wavelengths and less than 200 wavelengths of light.

8. A textured surface comprising a transparent substrate having at least two layers deposited on one side thereof, said layers having different refractive indexes and the layers or substrate having texturing such that selected wavelengths/colours are transmitted and wherein said texturing comprises pits or wells or is of sinusoidal waveform and wherein the diameter of the pits or wells or a distance between the peaks of said waveform is greater than 4 wavelengths and less than 200 wavelengths of light.

9. A textured surface as claimed in claim 8 wherein the diameter of the pits or wells or the distance between the peaks of said waveform is less than 200 wavelengths of light.

10. A security device comprising a surface as claimed in claim 8.

* * * * *